(12) United States Patent
Delle Coste

(10) Patent No.: US 9,414,614 B2
(45) Date of Patent: Aug. 16, 2016

(54) SEALED PACK OF INGREDIENTS FOR AN INDIVIDUAL SMOOTHIE, AND ASSOCIATED METHODS AND APPARATUSES

(75) Inventor: Riccardo Dario Delle Coste, Beverly Hills (AU)

(73) Assignee: BARFRESH INC., Las Vegas, NV (US)

( * ) Notice: Subject to any disclaimer, the term of this patent is extended or adjusted under 35 U.S.C. 154(b) by 810 days.

(21) Appl. No.: 11/660,415

(22) PCT Filed: Aug. 16, 2005

(86) PCT No.: PCT/AU2005/001228
§ 371 (c)(1),
(2), (4) Date: Dec. 4, 2007

(87) PCT Pub. No.: WO2006/017893
PCT Pub. Date: Feb. 23, 2006

(65) Prior Publication Data
US 2008/0089983 A1 Apr. 17, 2008

(30) Foreign Application Priority Data

Aug. 17, 2004 (AU) .............................. 2004904676
Feb. 16, 2005 (AU) .............................. 2005902204
Apr. 13, 2005 (AU) .............................. 2005201557

(51) Int. Cl.
*A23G 9/04* (2006.01)
*A23G 9/08* (2006.01)
(Continued)

(52) U.S. Cl.
CPC *A23G 9/04* (2013.01); *A23G 9/045* (2013.01); *A23G 9/08* (2013.01); *A23G 9/22* (2013.01);
(Continued)

(58) Field of Classification Search
CPC ........... A23G 9/04; A23G 9/045; A23G 9/08; A23G 9/22; A23G 9/42; A23G 9/52; A23L 6/52; A23L 2/386; G07F 9/105; G07F 13/065
USPC .................................................. 426/112, 115
See application file for complete search history.

(56) References Cited

U.S. PATENT DOCUMENTS 2,537,915 A * 1/1951 Roop ............................ 249/122
2,863,776 A    12/1958 Lisher ............................ 99/136
(Continued)

FOREIGN PATENT DOCUMENTS

AU        5388790        11/1990
AU     2005274678         8/2006
(Continued)

OTHER PUBLICATIONS

Statement of Grounds and Particulars in opposition of Australian Patent Application No. 2005274678, dated Jun. 18, 2007.
(Continued)

*Primary Examiner* — Erik Kashnikow
*Assistant Examiner* — C Smith
(74) *Attorney, Agent, or Firm* — Brinks Gilson & Lione

(57) ABSTRACT

A sealed pack (440) contains quantities of ingredients to make an individual smoothie portion. The ingredients comprise a flavor ingredient (410) such as pieces of fruit (strawberries, raspberries, mango), a frozen portion of liquid (420) such as water, fruit juice, milk, coffee or tea; and a consistency ingredient (430) such as ice-cream, sorbet and yoghurt. The pack may be subjected to a temperature sufficiently low to maintain the frozen state of some of the ingredients in the pack (440). Also disclosed is a method of packaging the ingredients into the pack, or into first and second containers, or into a container with compartments for different ingredients in frozen and unfrozen states; and a method of preparing an individual smoothie using the sealed pack wherein the ingredients are blended with additional liquid; and an apparatus that uses the sealed pack for automatically vending an individual smoothie portion.

30 Claims, 6 Drawing Sheets

(51) Int. Cl.

| | | |
|---|---|---|
| A23G 9/22 | (2006.01) | |
| A23G 9/32 | (2006.01) | |
| A23G 9/42 | (2006.01) | |
| A23G 9/52 | (2006.01) | |
| A23L 2/385 | (2006.01) | |
| G07F 9/10 | (2006.01) | |
| G07F 13/06 | (2006.01) | |

(52) U.S. Cl.
CPC .. *A23G 9/32* (2013.01); *A23G 9/42* (2013.01); *A23G 9/52* (2013.01); *A23L 2/385* (2013.01); *G07F 9/105* (2013.01); *G07F 13/065* (2013.01)

(56) References Cited

U.S. PATENT DOCUMENTS

| | | | | |
|---|---|---|---|---|
| 3,061,443 | A | 10/1962 | McLaughlin | 99/137 |
| 3,647,472 | A | 3/1972 | Speech et al. | 99/34 |
| 3,807,926 | A | 4/1974 | Morse | 425/331 |
| 4,081,560 | A * | 3/1978 | Ishigaki | 426/115 |
| 4,233,325 | A | 11/1980 | Slangan et al. | |
| 4,794,008 | A | 12/1988 | Schmidt et al. | |
| 4,874,618 | A | 10/1989 | Seaborne et al. | |
| 4,899,976 | A * | 2/1990 | Cederroth et al. | 249/61 |
| 4,988,529 | A | 1/1991 | Nakaya et al. | |
| 5,482,728 | A | 1/1996 | Tapfer et al. | |
| 5,486,373 | A | 1/1996 | Holt et al. | |
| 5,516,537 | A | 5/1996 | Fuisz | |
| 5,698,247 | A | 12/1997 | Hall | |
| 5,803,377 | A * | 9/1998 | Farrell | 241/36 |
| 5,962,060 | A * | 10/1999 | Farrell | 426/565 |
| 5,976,588 | A * | 11/1999 | Vincent | 426/119 |
| 6,068,875 | A | 5/2000 | Miller et al. | 426/565 |
| 6,090,426 | A | 7/2000 | Vincent | |
| 6,126,983 | A * | 10/2000 | Miller | 426/565 |
| 6,156,357 | A | 12/2000 | Franklin | |
| 6,176,090 | B1 | 1/2001 | Ufema | |
| 6,242,037 | B1 * | 6/2001 | Vincent | 426/590 |
| 6,258,394 | B1 | 7/2001 | Hochstein et al. | |
| 6,273,292 | B1 | 8/2001 | Milan | |
| 6,399,134 | B1 | 6/2002 | Best et al. | |
| 6,458,402 | B1 | 10/2002 | Chang | |
| 6,465,034 | B2 * | 10/2002 | Farrell | 426/524 |
| 6,511,693 | B2 | 1/2003 | Jones | |
| 6,548,097 | B1 | 4/2003 | Best et al. | |
| 6,772,675 | B2 * | 8/2004 | Ervin | 99/275 |
| 6,793,952 | B2 | 9/2004 | Fenn et al. | |
| 6,896,923 | B2 | 5/2005 | Ghaffari et al. | |
| 6,955,829 | B2 | 10/2005 | Binley et al. | |
| 7,074,452 | B2 | 7/2006 | Lebowitz | |
| 2002/0044997 | A1 | 4/2002 | Farrell | |
| 2002/0048626 | A1 * | 4/2002 | Miller et al. | 426/590 |
| 2002/0080678 | A1 | 6/2002 | Daniels, Jr. | |
| 2002/0098268 | A1 * | 7/2002 | Cohen et al. | 426/112 |
| 2002/0127307 | A1 * | 9/2002 | McGill | 426/112 |

FOREIGN PATENT DOCUMENTS

| | | | | |
|---|---|---|---|---|
| DE | 3219804 A1 | 3/1983 | | |
| DE | 3117940 A1 | 8/1983 | | |
| GB | 1050213 | 12/1966 | | A23G 5/00 |
| GB | 1124335 | 8/1968 | | A23H 1/00 |
| GB | 2 255 704 | 11/1992 | | |
| GB | 2381517 | 5/2003 | | |
| GB | 2381517 A | 5/2003 | | |
| JP | 60-66962 | * 4/1985 | | A23B 7/04 |
| JP | S60 66962 | 4/1985 | | |
| JP | 2003024021 A | 2/2003 | | |
| JP | 2004129596 A2 | 4/2004 | | |
| JP | 2004149596 A1 | 5/2004 | | |
| JP | 2004173645 A2 | 6/2004 | | |
| JP | 2004173646 A2 | 6/2004 | | |
| JP | 2004173651 A2 | 6/2004 | | |
| JP | 2004-180508 | 7/2004 | | A23G 9/12 |
| MY | P120053851 | 8/2006 | | |
| NL | 1009209 C | 11/1999 | | |
| RU | 195733 | 5/1967 | | |
| RU | 1761090 A1 | 9/1992 | | |
| TH | 10337 | 8/2006 | | |
| WO | WO 01/60184 | 8/2001 | | A23L 2/12 |
| WO | WO 0238011 A2 | 5/2002 | | |
| WO | WO 2004/091305 A1 | 10/2004 | | A23G 9/28 |

OTHER PUBLICATIONS

International Search Report dated Dec. 22, 2005.
International Preliminary Report dated Mar. 16, 2006.
Official Action dated Aug. 16, 2005 from corresponding Russian Patent Application 2007109792 with English Translation.
Extended European Search Report for European application No. 05773978.1 issued Dec. 6, 2010, 6 pages.
Office Action listed in Chinese patent application No. 200580033724.5 issued May 8, 2009, and English translation, 7 pages.
Official Action issued in Israeli patent application No. 2007IL-0181335 including an excerpt from cited reference US 2002127307, issued Jun. 16, 2010, 4 pages.
Communication Pursuant to Article 94(3) EPC, issued by the European Patent Office in European patent application No. 05 773 978.1—2114, dated Oct. 16, 2012, 5 pages.
Anonymous, "Juicers and Smoothies Drink Mixes," MINTEL Jun. 1999, retrieved from www.gnpd.com, database accession No. 10060135, 2 pages.
Anonymous, "Smoothie Mix," MINTEL, Jul. 1999, retrieved from www.gnpd.com, database accession No. 10060700, 1 page.
Anonymous, "All Natural Smoothie Fruit Mix," MINTEL Jul. 2004, retrieved from www.gnpd.com, database accession No. 10178227, 2 pages.
Official Action issued in Japanese patent application No. JP 2007-526119, dated May 10, 2011, with Translation of "Notice of Reasons for Rejection," 5 pages.
Office Action issued in Israeli patent application No. 181335, dated Jun. 9, 2010, 4 pages.
Office Action issued in Indonesian patent application No. W-00200700882, dated Nov. 17, 2011, and accompanying letter dated Dec. 1, 2011, from patent counsel explaining contents of the Office Action, 3 pages.
English translation of an Office Action issued in Japanese patent application No. 2007-526119, dated Nov. 29, 2011, 3 pages.
Office Action issued in Canadian patent application No. 2,577,163, dated May 9, 2012, 2 pages.
Summons to Attend Oral Proceedings from corresponding European patent application No. 05773978.1—1358, 4pgs., Jan. 29, 2015.

* cited by examiner

SEALED PACK OF INGREDIENTS FOR AN INDIVIDUAL SMOOTHIE, AND ASSOCIATED METHODS AND APPARATUSES

FIELD OF THE INVENTION

The present invention relates to packaging of ingredients for preparing compositions and methods for preparing compositions using pre-packed ingredients.

BACKGROUND

Five years ago, juice bars were the domain of grocers disposing of excess fruit, or health-food stores. However, juice bars have more recently become a significant part of the fast-food market and have begun to proliferate as franchises or independent enterprises. A key product of juice bars is the smoothie, which is a thick, smooth (in texture) drink generally comprising fruit pieces pureed or blended with ice-cream, sorbet or yoghurt and/or milk or juice. Non-fruit smoothies include alternative flavour ingredients to fruit such as chocolate, coffee, alcohol, etc. Other items may also be added such as energy-boosting supplements, muesli, proteins, raw eggs, etc.

FIG. 1 is a plan view of a layout of a conventional juice bar. Display counter 110 enables display of fresh fruit that is used in the preparation of smoothies and other juice bar products. A sink 120 is used to prepare the fresh fruit, which may be processed in the juicers 130. A freezer 140 is used to store items such as ice, ice-cream and yoghurt. A chiller/dispenser 150 is used to refrigerate liquid ingredients of smoothies and/or other juice bar products. A row of blenders 160 are used to blend the ingredients of smoothies and/or other juice bar products, which are subsequently dispensed into cups for delivery to customers. The customers pay at the till 170. Used blending containers are cleaned for reuse at the sink 180. Automatic dishwashing equipment may also be used, which may be installed under counter.

A juice bar such as that shown in FIG. 1 is typically operated by three to six operators. Preparation of a smoothie typically entails the steps of retrieving a clean container for blending, obtaining appropriate quantities of ingredients such as fruit, yoghurt and ice from respective storage areas in the juice bar, blending the smoothie, dispensing the smoothie into a cup and handing the smoothie to the respective customer. In preparing a smoothie, an operator is thus required to move around the juice bar. Although juice bars are generally laid out in accordance with workflow requirements, a substantial amount of movement by operators is unavoidable. This consumes time and limits the number of operators that can simultaneously prepare products such as smoothies.

A need thus exists for improved methods of supplying and preparing compositions such as smoothies.

SUMMARY

Aspects of the present invention provide apparatuses, methods and packaging for preparing compositions.

According to one aspect of the present invention, there is provided a method for packaging ingredients for preparing an individual portion of a composition. The method comprises the steps of storing at least one ingredient for the composition in a first container and storing the remaining ingredients for the composition in a second container. One or more of the remaining ingredients are frozen. The contents of the first container preferably remain unfrozen, even when the first and second containers are simultaneously subjected to a temperature sufficiently low to freeze the content of the second container. The contents of the first container may comprise a liquid base for the composition and may further comprise an agent that prevents freezing of the contents bf the first container.

According to another aspect of the present invention, there is provided a method for packaging ingredients for preparing a composition. The method comprises the steps of storing at least one ingredient for the composition in a first container, storing other ingredients for the composition in a second container and simultaneously subjecting the first and second containers to a temperature sufficiently low to freeze the content of the second container. The composition may comprise a smoothie and the at least one ingredient may comprise a liquid base for the smoothie.

According to another aspect of the present invention, there is provided a pre-packed pack containing ingredients for preparing an individual portion of a composition. The pack comprises a plurality of compartments for storing different ones of the ingredients, wherein the content of at least one of the compartments is frozen and the content of at least another one of the compartments remains unfrozen. The pre-packed pack may be subjected to a temperature sufficiently low to freeze the content of at least one of the compartments. The contents of the at least one compartment that remains unfrozen may comprise a liquid base and an agent that prevents freezing of the liquid base.

According to a further aspect of the present invention, there is provided a method for preparing a composition comprising the steps of transferring contents of a pre-packed pack to a container and blending the contents in the container. The pack comprises a plurality of compartments containing different ingredients of the composition. The contents of at least one of the compartments are frozen and the contents of at least another one of the compartments are unfrozen. The contents of the at least one compartment that remains unfrozen may comprise an agent that prevents freezing of the contents of the at least one compartment. The content of the at least one compartment that remains unfrozen may comprise a liquid base for preparing the composition. The composition may comprise a smoothie and the pack may comprise ingredients for preparing a single smoothie portion.

Another aspect of the present invention provides a method for storing ingredients for preparing an individual portion of a smoothie. The method comprises the steps of placing a flavour ingredient into a pack, placing into the pack a frozen portion of liquid, placing into the pack at least one additional consistency ingredient and subjecting the pack to a temperature sufficiently low to maintain the frozen state of at least certain of the ingredients of the pack. The quantities of the ingredients in the sealed pack are based on a target quantity of an individual smoothie portion.

Yet another aspect of the present invention provides a sealed pack containing ingredients for preparing an individual portion of a smoothie. The pack comprises a flavour ingredient, a frozen portion of liquid and at least one additional consistency ingredient. The quantities of the ingredients in the sealed pack are determined based on a target quantity of an individual smoothie portion.

Still another aspect of the present invention provides a method for preparing an individual portion of a smoothie comprising the steps of transferring contents of a sealed pack to a container, adding a portion of liquid to the container and blending the contents of the container. The contents of the sealed pack comprise a flavour ingredient, a frozen portion of liquid and at least one additional consistency ingredient. The quantities of the contents of the sealed pack are based on a target quantity of an individual smoothie portion.

Another aspect of the present invention provides an apparatus for automatically vending individual smoothie portions. The apparatus comprises first dispensing means for dispensing the contents of a sealed pack into a container, second dispensing means for dispensing a portion of liquid into the container, blending means for blending the contents of the container and vending means for vending the contents of the container as an individual smoothie portion. The contents of the sealed pack comprise a flavour s ingredient, a frozen portion of liquid and at least one additional consistency ingredient. The quantities of the contents of the sealed pack are based on a target quantity of an individual smoothie portion.

Still another aspect of the present invention provides an apparatus for automatically vending individual smoothie portions. The apparatus comprises first dispensing means for dispensing ingredients for a smoothie into a container, second dispensing means for dispensing a portion of liquid into the container, blending means for blending the contents of the container and vending means for vending a portion of the contents of the container as an individual smoothie portion. The ingredients comprise a flavour ingredient, a frozen portion of liquid and at least one additional consistency ingredient.

BRIEF DESCRIPTION OF THE DRAWINGS

A small number of embodiments are described hereinafter, by way of example only, with reference to the accompanying drawings in which.

DETAILED DESCRIPTION

Embodiments of methods and packaging for preparing compositions are described hereinafter. Although the embodiments are particularly described with reference to smoothies, it is not intended that the present invention be restricted in this way. Specifically, the present invention has application to other types of compositions and particularly to other compositions for human consumption, such as soups.

Use of the term 'smoothie' in the present document is intended to include fruit-based smoothies and non-fruit-based smoothies, which may include flavour ingredients such as coffee, chocolate and alcohol. Furthermore, smoothies may be dairy-based or non-dairy-based.

Use of the term 'unfrozen' in the present document is intended to mean 'not completely frozen' and to include 'partially frozen', 'slushy' and 'icy' within the scope of the intended meaning. Use of the term 'partially frozen' in the present document is intended to mean 'not completely frozen' and to include 'slushy' and 'icy' within the scope of the intended meaning.

Use of the phrase 'an individual portion', in the present document is intended to mean a portion suitable for consumption by one person or individual. However, such portions may vary in size or volume to cater for different individuals (e.g.; adults and children or small, medium and large).

Figure 1:
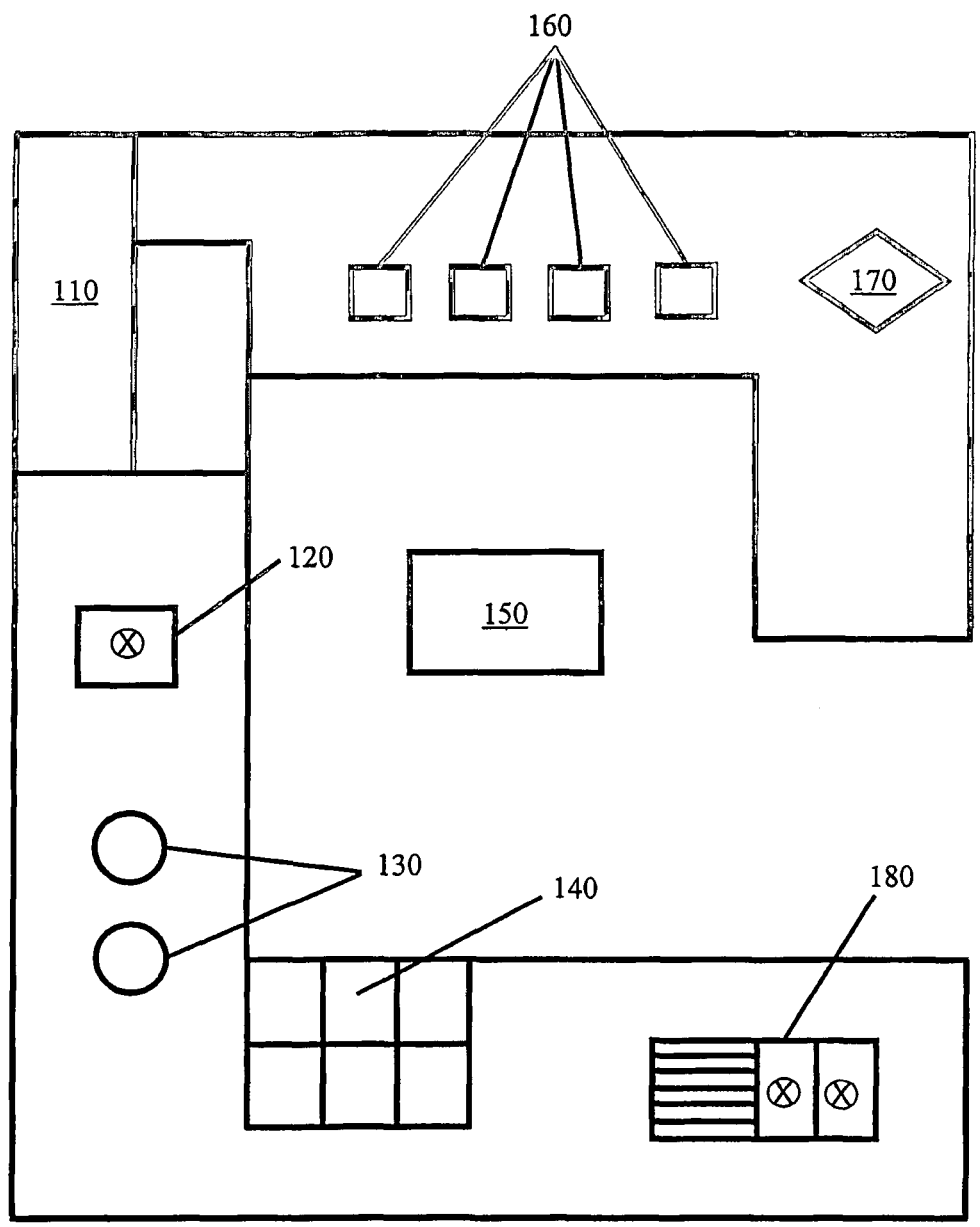
FIG. 1 is a plan view of a layout of a conventional juice bar.
Figure 2:
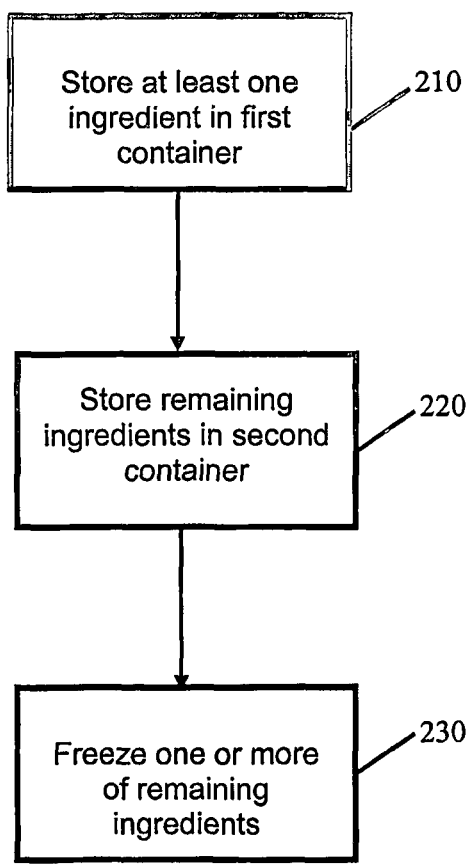
FIG. 2 shows a flow diagram of a method for packaging ingredients for preparing a composition such as a smoothie.

FIG. 2 shows a flow diagram of a method for packaging ingredients for preparing a composition such as a smoothie. At step 210, at least one ingredient for the composition is stored in a first container. At step 220, remaining ingredients for preparing the composition are stored in a second container. One or more of the remaining ingredients in the second container may be frozen at step 230. In some cases, already frozen ingredients are stored in the second container and step 230 may serve to maintain such in a frozen state.

For making a smoothie, the contents of the first container comprise a liquid base such as apple juice concentrate or mango nectar, which is maintained in an unfrozen state. Prevention of freezing of the liquid base advantageously yields an improved texture of the prepared smoothie in comparison to use of a frozen base. If two smoothies with identical ingredients, apart from the one smoothie's juice base being liquid and the other smoothie's juice base being frozen, are blended in identical blenders, the smoothie with the liquid base will have a smoother or more liquid texture than the smoothie with the frozen base. The contents of the second container comprise the remaining ingredients for preparing the smoothie such as frozen yoghurt, individually quick frozen (IQF) fruit and ice flakes. The IQF fruit may, for example, comprise whole strawberries, raspberries, boysenberries and mango chunks.

In one embodiment, the first and second containers comprise separate compartments of a single package containing ingredients for preparing a single portion of a smoothie. In this instance, the entire package is subjected to a sufficiently low temperature to ensure that the contents of the second compartment are frozen. However, the liquid contents of the first compartment are prevented from freezing. One method used to prevent freezing is the addition of an 'anti-freeze' additive to the liquid base content. Another method of preventing freezing is use of a thermally insulating material for the first compartment. The methods may be employed separately or in combination.

In an alternative embodiment, the first and second containers comprise separate packs. Accordingly, a number of first containers may be packed in a larger container (for example, plastic bottles in a cardboard box or plastic crate) for ease of handling and delivery to juice bars. A number of the second containers may similarly be consolidated in a larger container, with the larger container being subjected to sufficiently low temperatures to freeze the contents of the number of second containers.

Three examples of ingredient lists for fruit smoothies that may be packaged and/or prepared according to the methods described herein are provided hereinafter:

Mixed Berry Fruit Smoothie
1. Apple juice concentrate (liquid form): 200 ml
2. Strawberry-flavoured frozen yoghurt: 180 ml
3. Strawberries (IQF): 2 whole berries @ 11 g each=22 g
4. Raspberries (IQF): 2 whole berries @ 2 g each=4 g
5. Ice flakes: 0.75 cup Mango Fruit Smoothie
1. Mango nectar (liquid form): 150 ml
2. Mango pieces (frozen): 3 pieces @ 6 g each=18 g
3. Mango-flavoured frozen yoghurt: 180 ml
4. Ice flakes: 0.75 cup Tropical Fruit Smoothie
1. Tropical juice (liquid form): 200 ml
2. Mango-flavoured frozen yoghurt: 180 ml
3. Mango pieces (frozen): 1 piece @ 6 g each=6 g
4. Strawberries (IQF): 1 whole berry @ 11 g each=11 g 5. Raspberries (IQF): 2 whole berries @ 2 g each=4 g
6. Ice flakes: 0.5 cup Individually frozen fruit avoids the need for pre-blended fruit mix, which contributes to the texture and freshness of the smoothies.

Figure 3:
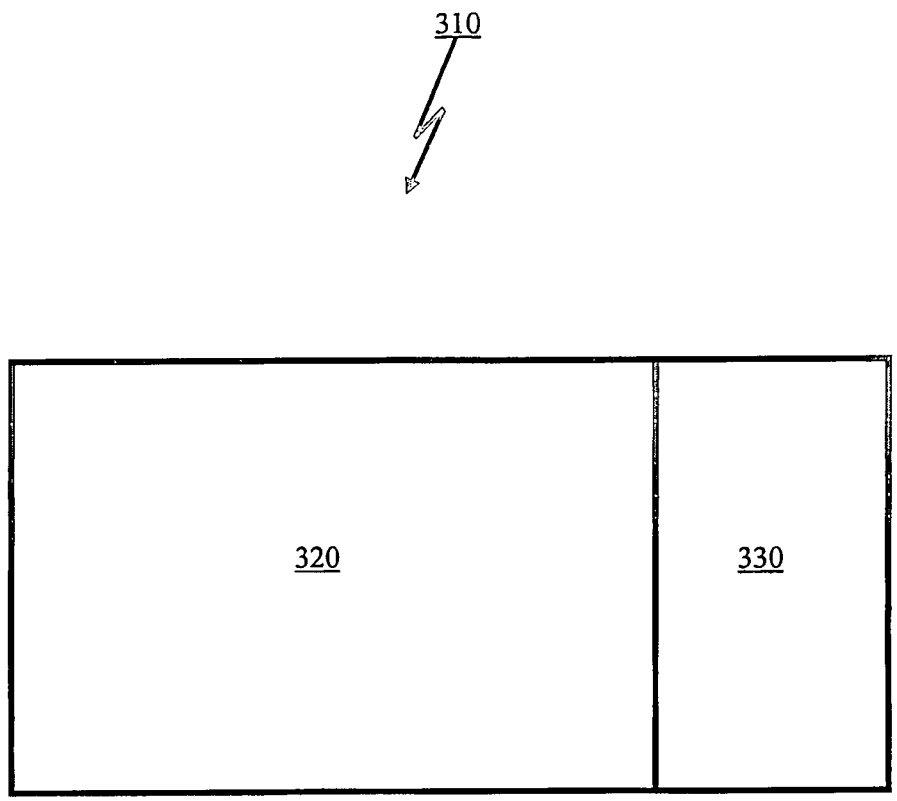
FIG. 3 shows a pre-mix pack for preparing an individual portion of a composition such as a smoothie.

FIG. 3 shows a pre-mix pack for preparing an individual smoothie. The pack 310 comprises two separate compartments 320 and 330 for storing frozen and non-frozen ingredients, respectively. The pre-mix pack may be constructed from flexible plastic material. Thermal insulation may be provided by a metallic deposition on the plastic material.

Figure 4:
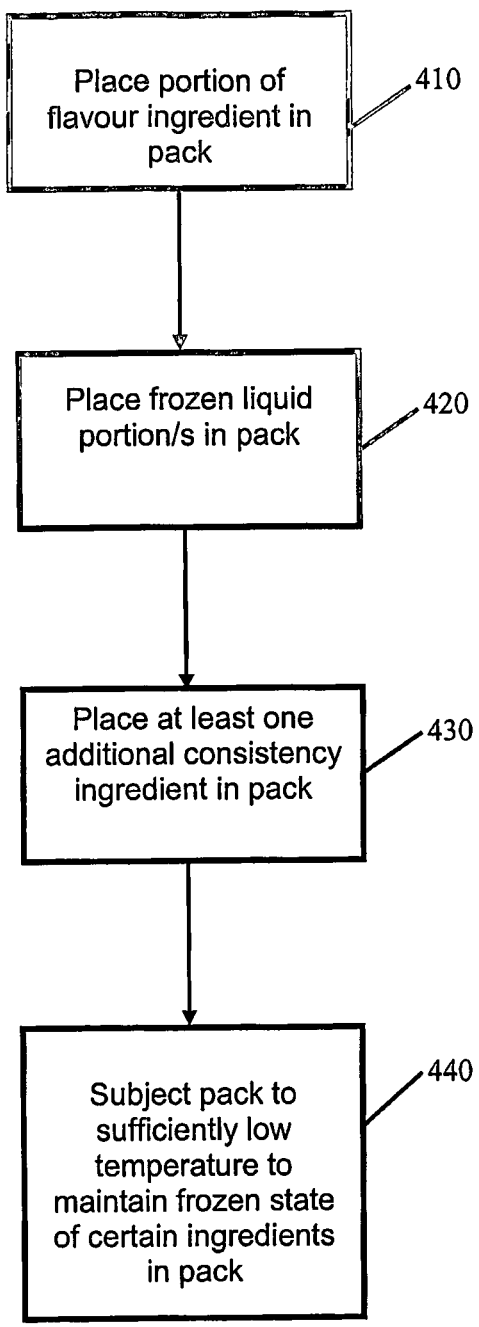
FIG. 4 shows a flow diagram of a method for storing ingredients for preparing an individual portion of a smoothie.

FIG. 4 shows a flow diagram of a method for storing ingredients for preparing an individual portion of a smoothie. At step 410, a flavour ingredient is placed in a pack. The flavour ingredient may, for example, comprise fruit, chocolate, coffee, alcohol, etc. For the case of fruit, individually frozen pieces of fruit may be used for ease of preparing the pack and/or to assist later blending of the contents of the pack. However, a portion of fruit in another form such as puree may alternatively be used. Fresh fruit may also be used, although this would disadvantageously have a relatively shorter lifespan. At step 420, a frozen portion of liquid is placed in the pack. The frozen liquid portion may, for example, comprise multiple, small, individually frozen portions of water (ice), fruit juice, milk, tea and/or coffee. This contributes to improved consistency and texture of the smoothie and assists in preventing damage to or reducing wear of the blender while blending the contents of the pack. In certain embodiments, the frozen liquid portion comprises multiple hollow frozen portions (e.g., hollow ice cubes). If not hollow, it is preferable that the frozen liquid portions are of a smaller size to assist in preventing damage to the blender. At step 430, at least one additional consistency ingredient is placed in the pack. The at least one additional consistency ingredient contributes to the texture or runniness of the smoothie and may, for example, comprise ice-cream, sorbet and/or yoghurt. The quantities of the ingredients in the sealed pack are determined based on a target quantity of an individual smoothie portion. The pack is subjected to a temperature that is sufficiently low to maintain the frozen state of at least certain of the contents of the pack, at step 440. Other ingredients such as energy-boosting supplements, muesli, proteins, raw eggs, etc., may also be added to the smoothie.

Figure 5:
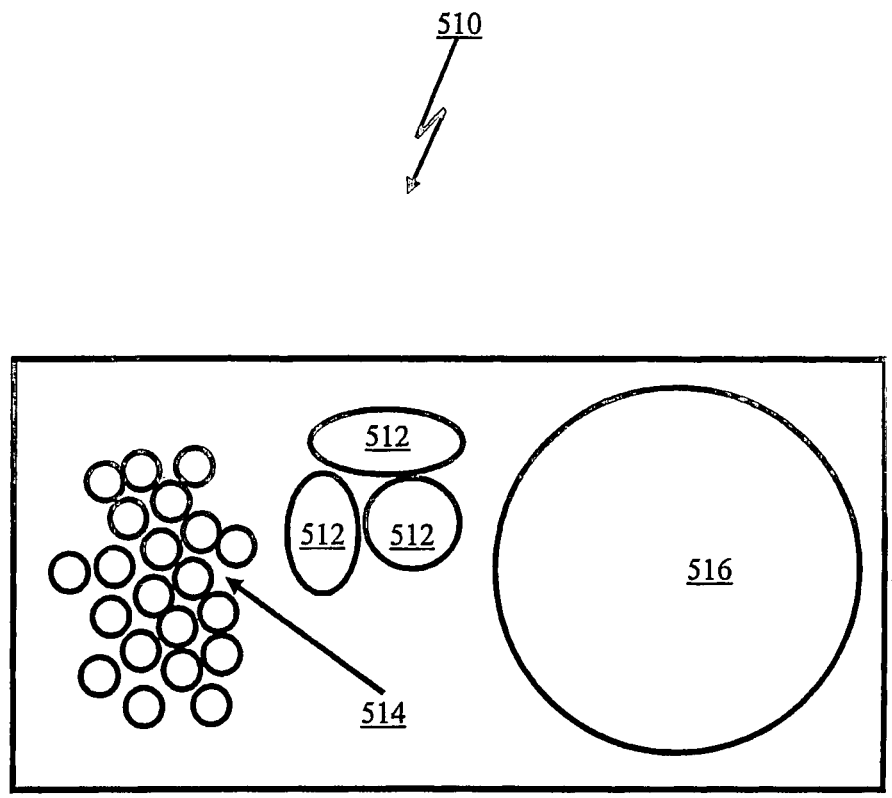
FIG. 5 shows a sealed pack of ingredients for preparing an individual portion of a smoothie.

FIG. 5 shows a sealed pack of ingredients for preparing an individual portion of a smoothie. The sealed pack 510 comprises portions of fruit 512, frozen portions of liquid 514 and at least one additional consistency ingredient 516. Individually frozen pieces of fruit may be used to assist later blending of the contents of the pack. However, a portion of fruit in another form such as puree may alternatively be used. Fresh fruit may also be used, although this would disadvantageously have a relatively shorter lifespan. Other flavour ingredients such as coffee, chocolate, alcohol, etc. may alternatively be used in place of fruit. The frozen liquid portions 514 preferably comprise multiple, small, individually frozen portions of water (ice), fruit juice, milk, tea and/or coffee. This contributes to improved consistency and texture of the smoothie and assists in preventing damage while blending the contents of the pack. In certain embodiments, the multiple frozen liquid portions 514 are hollow (e.g., hollow ice cubes). If not hollow, it is preferable that the frozen liquid portions 514 are of a smaller size to assist in preventing damage to or reducing wear of the blender. The at least one additional consistency ingredient 516 contributes to the texture or runniness of the smoothie and may, for example, comprise ice-cream, sorbet and/or yoghurt. The quantities of the ingredients in the sealed pack are typically determined based on a target quantity of an individual smoothie portion. The pack 510 typically comprises a sealable or re-sealable disposable container such as a plastic bag or a plastic cup. Other ingredients such as energy-boosting supplements, muesli, proteins, raw eggs, etc., may also be added to the smoothie.

Figure 6:
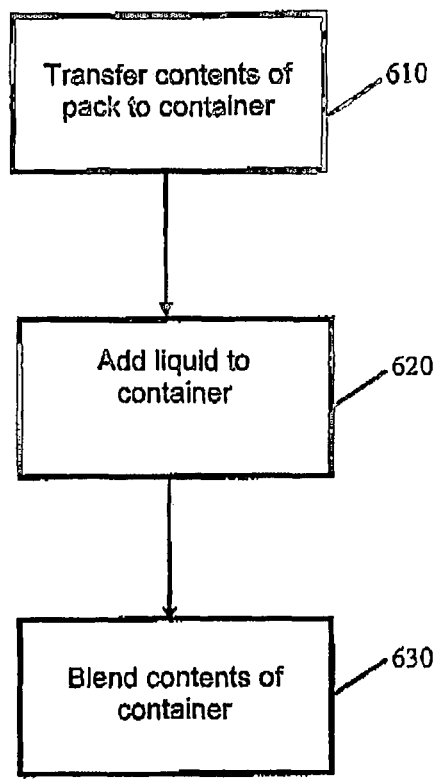
FIG. 6 shows a flow diagram of a method for preparing an individual portion of a smoothie.

FIG. 6 shows a flow diagram of a method for preparing an individual portion of a smoothie. At step 610, the contents of a sealed pack are transferred to a container for blending. Contents of the pack comprise a flavour ingredient, a frozen portion of liquid and at least one additional consistency ingredient, which contributes to the texture or runniness of the smoothie and may, for example, comprise ice-cream, sorbet and/or yoghurt. The flavour ingredient may comprise a portion of fruit in the case of a fruit smoothie. The frozen liquid portions preferably comprise multiple, small, individually frozen portions of water (ice), fruit juice, milk, coffee and/or tea. This contributes to improved consistency and texture of the smoothie and assists in preventing damage while blending the contents of the pack. In certain embodiments, the multiple frozen liquid portions are hollow (e.g., hollow ice cubes). If not hollow, it is preferable that the frozen liquid portions are of a smaller size to assist in preventing damage to or reducing wear of the blender. Individually frozen pieces of fruit are preferably used to assist later blending of the contents of the pack. However, a portion of fruit in another form such as puree may, alternatively be used. Fresh fruit may also be used, although this would disadvantageously have a relatively shorter [useful] lifespan. The quantities of the contents in the sealed pack are typically determined based on a target quantity of an individual smoothie portion. A portion of liquid is added to the container at step 620 and the contents of the container are blended at step 630. Presence of liquid is necessary for the blending process. The liquid may, for example, comprise water, fruit juice, milk, tea and/or coffee. Other ingredients such as energy-boosting supplements, muesli, proteins, raw eggs, etc., may also be added to the smoothie.

In certain embodiments, a vending machine is used to blend and vend single portions of smoothies, as described hereinbefore. Certain or all of the ingredients may be stored or pre-packed in individual portions or serves in the vending machine as described hereinbefore. Alternatively, certain or all of the ingredients may be stored in bulk in the vending machine and be dispensed in appropriate quantities for preparing single smoothie portions. For example, a vending machine may store packs such as those described in relation to and shown in FIG. 5 for blending with an amount of liquid dispensed from a bulk tank, which may be located internally or externally to the vending machine. The liquid may, for example, comprise water, fruit juice, milk, tea and/or coffee. Other ingredients such as energy-boosting supplements, muesli, proteins, raw eggs, etc., may also be added to the smoothies. The vending machine thus provides automatic blending and dispensing of individual smoothie portions.

Methods and packaging for smoothies and other compositions have been described hereinbefore. Such methods and packaging are advantageous in that they can ensure exact portioning and thus provide improved consistency and quality control at the point of manufacture and sale. Pre-packed ingredients for producing individual smoothie portions are designed to suitably fill standard cup sizes used by a juice bar or vendor and wastage can thus be reduced or eliminated. Packaging of individual smoothie portions also advantageously results in less labour and real estate being required at the point of manufacture and sale. This translates to less staff and smaller juice bars and, consequently, lower operating costs. Moreover, purchase of all or most of the ingredients in a single package will likely result in savings throughout the entire supply chain. Packaging of individual smoothie portions also advantageously enables quicker preparation of smoothies, thus permitting increased productivity and increased customer satisfaction.

The foregoing detailed description provides exemplary embodiments only, and is not intended to limit the scope, applicability or configurations of the invention. Rather, the description of the exemplary embodiments provides those skilled in the art with enabling descriptions for implementing an embodiment of the invention. Various changes may be made in the function and arrangement of elements without departing from the spirit and scope of the invention as set forth in the claims hereinafter.

Where specific features, elements and steps referred to herein have known equivalents in the art to which the invention relates, such known equivalents are deemed to be incorporated herein as if individually set forth. Furthermore, features, elements and steps referred to in respect of particular embodiments may optionally form part of any of the other embodiments unless stated to the contrary.

Embodiments of the invention have application beyond juice bars. For example, methods and packaging for preparing compositions described hereinbefore may be used in various retail outlets such as supermarkets, various food providers such as restaurants, cafes, and coffee shops and private homes.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A sealed pack containing ingredients for preparing an individual portion of a smoothie, said pack comprising:
    a flavour ingredient, the flavour ingredient being of a quantity selected to be suitable for said individual portion of said smoothie and of a quantity to suitably fill a cup of a standard cup size at a retail location;
    a frozen portion of liquid which is independent of and not derived from said flavour ingredient, said frozen portion of liquid being of a quantity selected to be suitable for the individual portion of the smoothie in combination with the quantity of the flavour ingredient when served in the cup of the standard cup size wherein said frozen portion of liquid comprises a plurality of hollow frozen portions of liquid; and
    at least one additional consistency ingredient having a texture selected to provide a predetermined product consistency of the smoothie when blended in a blender together with the flavour ingredient, the frozen portion of liquid, and a predetermined portion of liquid, and transferred from the blender to the cup of the standard cup size at the retail location, the at least one consistency ingredient being of a quantity selected to be suitable for the individual portion of the smoothie in combination with the quantity of the flavour ingredient and in combination with the quantity of the flavour ingredient when served in the cup of the standard cup size;
    wherein said sealed pack comprises a flexible plastic bag; and
    wherein said frozen portion of liquid comprises a plurality of individual pieces of frozen liquid sized to contribute through the blending to the predetermined product consistency.

2. A sealed pack according to claim 1, wherein said frozen portion of liquid comprises a plurality of frozen portions of at least one liquid selected from the group of liquids consisting of water, fruit juice, milk, coffee and tea.

3. A sealed pack according to claim 1, wherein said flavour ingredient comprises a portion of fruit.

4. A sealed pack according to claim 3, wherein said portion of fruit comprises a plurality of individually frozen pieces of fruit.

5. A sealed pack according to claim 1, wherein said sealed pack comprises a disposable plastic bag.

6. A sealed pack according to claim 1, wherein said at least one additional consistency ingredient is selected from the group of ingredients consisting of ice-cream, sorbet and yoghurt.

7. A sealed pack according to claim 1 wherein the plurality of hollow frozen portions of liquid are intentionally made to be hollow.

8. A sealed pack according to claim 1 wherein the plurality of hollow frozen portions of liquid comprise water ice.

9. A sealed pack according to claim 1 wherein the plurality of hollow frozen portions of liquid comprise frozen hollow portions of liquid to improve consistency and to prevent damage while blending contents of the pack in a blender.

10. A method comprising:
    providing the sealed pack of claim 1;
    at a retail location, emptying the flavour ingredient, the frozen portion of liquid, and the at least one additional consistency ingredient into a blender;
    combining the flavour ingredient, the frozen portion of liquid, and the at least one additional consistency ingredient in the blender with the predetermined portion of a liquid;
    blending in the blender the flavour ingredient, the frozen portion of liquid and the at least one additional consistency ingredient from the sealed pack with the predetermined portion of the liquid to establish a predetermined product consistency of the individual portion of a smoothie; and
    transferring the blended smoothie from the blender to a cup of a standard cup size for serving the individual portion of a smoothie to a customer of the retail location.

11. A method for making a single-serving smoothie product, the method comprising:
    selecting a sealed pack suitable for the single-serving smoothie product for sale to an end consumer at a point of sale, the sealed pack containing:
        a flavour ingredient contained in the sealed pack in an amount suitable to produce an individual smoothie portion of a predetermined size to serve an individual person in a quantity to suitably fill a cup of a standard cup size at the point of sale;
        a frozen portion of water or fruit juice contained in the sealed pack in an amount selected to produce the individual smoothie portion when combined with the amount of the flavor ingredient when served in the cup of the standard cup size, the frozen portion of water or fruit juice comprising a plurality of individual pieces of frozen liquid sized to contribute through the blending to the predetermined product consistency; and
        at least one additional consistency ingredient contained in the sealed pack in an amount to produce the individual smoothie portion when combined with the amount of the flavor ingredient and the amount of the frozen portion of water or fruit juice when served in the cup of the standard cup size, the at least one additional consistency ingredient selected to consistently produce single-serving smoothies including the single-serving smoothie product with a predetermined texture or runniness following blending of the at least one additional consistency ingredient with the flavor ingredient, the frozen portion of water or fruit juice, and a predetermined portion of liquid, and after transfer from the sealed pack to a cup of the standard cup size for serving to the end consumer;

transferring the flavour ingredient, the frozen portion of water of fruit juice, and the at least one additional consistency ingredient or the sealed pack to a container for blending;

adding the predetermined portion of a liquid to the container;

blending the flavour ingredient, the frozen portion of water or fruit juice, and the at least one additional consistency ingredient with the predetermined portion of the liquid in the container to establish the predetermined product consistency of the smoothie product; and transferring the blended smoothie product from the container to a cup of a standard cup size for serving to a customer at the point of sale.

12. The method of claim 11 wherein the amount of the flavor ingredient, the frozen portion of water or fruit juice and the at least one additional consistency ingredient are selected to produce the individual smoothie portion of a size to suitably fill the standard size cup used by a vendor of the single serving smoothie product.

13. The method of claim 11 wherein said frozen portion of water or fruit juice comprises a plurality of frozen portions of liquid made hollow to prevent damage to the container during blending.

14. The method of claim 11 wherein said frozen portion of water or fruit juice comprises a plurality of frozen portions of liquid of a size selected to be small enough to prevent damage to the container during blending.

15. The method of claim 14 wherein said frozen portion of water or fruit juice comprises flakes of water ice.

16. The method of claim 11 wherein the flavor ingredient comprises a portion of fruit.

17. The method of claim 16 wherein the portion of fruit comprises a plurality of individually frozen pieces of fruit selected to have a size suitable to assist in the blending of the portion of fruit with the flavor ingredient and the frozen portion of water or fruit juice to produce the individual smoothie portion at the predetermined product consistency.

18. The method of claim 11 wherein said at least one additional consistency ingredient is selected from the group of ingredients consisting of ice-cream, sorbet and yoghurt.

19. The method of claim 11 wherein the flavor ingredient comprises a plurality of individually frozen pieces of fruit and wherein the frozen portion of water or fruit juice comprises water or the frozen juice of a different fruit.

20. The method of claim 11 wherein the flavor ingredient comprises a plurality of individually frozen pieces of fruit and wherein the frozen portion of water or fruit juice comprises multiple, small, individually frozen portions of water ice having a size selected to be small enough to prevent damage to the container during blending.

21. The method of claim 11 wherein the frozen portion of water or fruit juice comprises ice flakes.

22. The method of claim 11 wherein adding a predetermined portion of a liquid to the container comprises adding one or more of water, fruit juice, milk, tea or coffee to the container.

23. A method for preparing an individual portion of a smoothie, the method comprising:

selecting a flavour ingredient for the smoothie, the flavour ingredient selected of a quantity suitable for the individual portion of the smoothie and of a quantity to suitably fill a cup of a standard cup size when served at a retail location;

selecting a frozen portion of liquid, the frozen portion of liquid selected of a quantity suitable for the individual portion of the smoothie in combination with the quantity of the flavour ingredient when served in the cup of the standard cup size, the frozen portion of liquid comprising a plurality of individual pieces of frozen liquid sized to contribute through the blending to a predetermined product consistency;

selecting at least one additional consistency ingredient to provide to the smoothie a predetermined product consistency and texture when combined with the flavour ingredient, the frozen portion of liquid, and a predetermined portion of liquid, for serving in the cup of the standard cup size at the retail location;

combining the flavour ingredient and the frozen portion of liquid with the at least one consistency ingredient in a disposable container sized for the individual portion of the smoothie; and freezing together the flavour ingredient, the frozen portion of liquid, and the at least one consistency ingredient together in the disposable container for shipment to the retail location.

24. The method of claim 23 wherein selecting a flavour ingredient for the smoothie comprises selecting a plurality of individually frozen pieces of fruit.

25. The method of claim 24 wherein selecting a frozen portion of liquid comprises selecting at least one of water, fruit juice, milk, coffee and tea.

26. The method of claim 25 wherein selecting at least one additional consistency ingredient comprises selecting one of ice-cream, sorbet and yoghurt.

27. The method of claim 23 further comprising:

at the retail location, emptying frozen contents of the disposable container into a blender;

blending in the blender the flavour ingredient, the frozen portion of liquid and the at least one additional consistency ingredient with a portion of liquid to establish a predetermined product consistency of the smoothie; and transferring the blended smoothie from the blender to a cup of a standard cup size for serving to a customer.

28. The method of claim 23 wherein combining the flavour ingredient and the frozen portion of liquid with the at least one consistency ingredient in a disposable container comprises:

combining the flavour ingredient and the plurality of individual pieces of frozen liquid with the at least one consistency ingredient mixed together in a disposable plastic bag.

29. A pack of ingredients, said pack comprising:

a flavour ingredient;

a plurality of individual pieces of frozen liquid, the plurality of individual pieces of frozen liquid being hollow frozen portions of liquid which is independent of and not derived from the flavor ingredient;

an additional consistency ingredient; and a sealed flexible plastic bag containing the flavour ingredient, the plurality of individual pieces of frozen liquid, and the consistency ingredient;

wherein the flavour ingredient, the plurality of individual pieces of frozen liquid, and the additional consistency ingredient are each of a respective quantity selected to be suitable to produce an individual portion of a smoothie having a predetermined product consistency by blending together in a blender the respective quantity of flavour ingredient, the respective quantity of the plurality of individual pieces of frozen liquid, the respective quantity of the additional consistency ingredient, and a predetermined quantity of liquid;

wherein the plurality of individual pieces of frozen liquid are sized to contribute through the blending to the predetermined product consistency; and wherein the additional consistency ingredient has a texture that is different from a texture of the flavour ingredient and different from a texture of the plurality of individual pieces of frozen liquid and suitable to contribute to the predetermined product consistency.

30. A pack of ingredients, said pack comprising:

a flavour ingredient;

a plurality of individual pieces of frozen liquid, the plurality of individual pieces of frozen liquid being hollow frozen portions of liquid which is independent of and not derived from the flavor ingredient;

an additional consistency ingredient with a creamy texture; and a sealed flexible plastic bag containing the flavor ingredient, the plurality of individual pieces of frozen liquid, and the consistency ingredient;

wherein the flavour ingredient, the plurality of individual pieces of frozen liquid, and the additional consistency ingredient are each of a respective quantity selected to be suitable to produce an individual portion of a smoothie having a predetermined product consistency by blending together in a blender the respective quantity of flavour ingredient, the respective quantity of the plurality of individual pieces of frozen liquid, the respective quantity of the additional consistency ingredient, and a predetermined quantity of liquid; and wherein the plurality of individual pieces of frozen liquid are sized to contribute through the blending to the predetermined product consistency.

* * * * *